United States Patent
Horng et al.

(10) Patent No.: US 6,809,457 B1
(45) Date of Patent: Oct. 26, 2004

(54) BRUSHLESS DC MOTOR WITH A REDUCED THICKNESS

(75) Inventors: Alex Horng, Kaohsiung (TW); Yin-Rong Horng, Kaohsiung (TW); Ching-Sheng Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/445,917

(22) Filed: May 28, 2003

(30) Foreign Application Priority Data

Apr. 4, 2003 (TW) ........................................ 92107959 A

(51) Int. Cl.$^7$ ................................................. H02K 1/22
(52) U.S. Cl. ..................... 310/267; 310/261; 310/49 A; 310/68 B
(58) Field of Search .............................. 310/257, 67 R, 310/63, 42, 164, 162, 68 B, 62, 49 R; 417/423.7

(56) References Cited

U.S. PATENT DOCUMENTS

| | | | | |
|---|---|---|---|---|
| 3,495,107 A | * | 2/1970 | Haydon | 310/49 R |
| 3,508,091 A | * | 4/1970 | Kavanaugh | 310/49 R |
| 4,891,567 A | * | 1/1990 | Fujitani et al. | 318/254 |
| 5,093,599 A | * | 3/1992 | Horng | 310/254 |
| 5,679,997 A | * | 10/1997 | Matsuzawa et al. | 310/254 |
| 5,917,262 A | * | 6/1999 | Huang et al. | 310/254 |
| 5,967,763 A | * | 10/1999 | Horng | 417/423.7 |
| 6,050,785 A | * | 4/2000 | Horng | 417/354 |
| 6,109,892 A | * | 8/2000 | Horng | 417/423.15 |
| 6,114,785 A | * | 9/2000 | Horng | 310/68 B |
| 6,166,470 A | * | 12/2000 | Miyazawa et al. | 310/181 |
| 6,246,140 B1 | * | 6/2001 | Horng | 310/91 |
| 6,265,797 B1 | * | 7/2001 | Horng | 310/90 |
| 6,278,248 B1 | * | 8/2001 | Hong et al. | 318/254 |
| 6,285,108 B1 | * | 9/2001 | Horng | 310/259 |
| 6,309,191 B1 | * | 10/2001 | Hu | 417/423.12 |
| 6,320,294 B1 | * | 11/2001 | Kliman | 310/257 |
| 6,400,053 B1 | * | 6/2002 | Horng | 310/91 |
| 6,400,054 B1 | * | 6/2002 | Horng | 310/91 |
| 6,407,473 B1 | * | 6/2002 | Horng et al. | 310/68 B |
| 6,414,411 B1 | * | 7/2002 | Horng et al. | 310/194 |
| 6,462,443 B2 | * | 10/2002 | Horng | 310/68 B |
| 6,483,209 B1 | * | 11/2002 | Horng et al. | 310/51 |
| 6,538,357 B2 | * | 3/2003 | Horng et al. | 310/257 |
| 6,700,293 B1 | * | 3/2004 | Horng et al. | 310/254 |
| 6,710,504 B2 | * | 3/2004 | Ohiwa et al. | 310/257 |
| 6,720,694 B2 | * | 4/2004 | Horng et al. | 310/90 |

OTHER PUBLICATIONS

The American Heritage Dictionary of the English Language, 1992, Houghton Mifflin Company, 3rd edition.*

* cited by examiner

*Primary Examiner*—Burton S. Mullins
*Assistant Examiner*—Heba Elkassabgi
(74) *Attorney, Agent, or Firm*—Bacon & Thomas, PLLC

(57) ABSTRACT

A brushless DC motor includes a pole plate, a magnetic pole base, a coil assembly, a circuit board, and a rotor. Each of the pole plate and the magnetic pole base is formed by punching a magnetically conductive plate and includes several pole faces and a magnetically conductive tube, with the respective pole faces being annularly located around the respective magnetically conductive tube. The magnetically conductive tube of the magnetic pole plate and the magnetically conductive tube of the pole base are securely mounted one around the other to form an axle tube. At least one bearing is received in the axle tube for rotatably holding a shaft of the rotor. The pole faces of the magnetic pole base and the pole faces of the pole plate are alternately disposed and located around the axle tube.

17 Claims, 9 Drawing Sheets

BRUSHLESS DC MOTOR WITH A REDUCED THICKNESS

BACKGROUND OF THE INVENTION

1. Field of the Invention

The present invention relates to a brushless DC motor with a reduced thickness.

2. Description of Related Art

FIG. 9 of the drawings illustrates a conventional brushless DC motor with an axial winding. The brushless DC motor includes an upper pole plate 10a, a lower pole plate 10a, a coil assembly 20, a rotor 30, a circuit board 40, a metal axle tube 50, and a base 60. The upper and lower pole plates 10a are mounted to two sides of a bobbin 21 of the coil assembly 20 to form a stator. The stator and the circuit board 40 are mounted around the metal axle tube 50 and thus stacked on the base 60. The rotor 30 includes a shaft 31 extended through the metal axle tube 50. A change in the polarities of a plurality of magnetic pole faces 101 on the pole plates 10a drives the rotor 30 to turn. Although such a brushless DC motor is widely used in various kinds of electronic devices, there are too many parts for the stator (including the coil assembly 20, the bobbin 21, the circuit board 40, the metal axle tube 50, and the upper and lower pole plates 10a). The parts of the stator are stacked on the base 60 and thus increase an overall thickness and overall volume of the brushless DC motor. As a result, it is difficult to further reduce the overall thickness and volume of the brushless DC motor.

OBJECTS OF THE INVENTION

The object of the present invention is to provide a brushless DC motor including a magnetic pole base and a pole plate that are respectively formed by means of punching a magnetically conductive plate. Each of the magnetic pole base and the pole plate includes a plurality of pole faces and a magnetically conductive tube. The magnetic pole base can be used as a base on which the parts of the stator are mounted, thereby reducing the number of parts of the brushless DC motor, simplifying the structure of the brushless DC motor, and reducing the manufacture cost of the brushless DC motor.

Another object of the present invention is to provide a brushless DC motor in which the magnetic pole base can be used as a base for mounting a coil assembly and a circuit board of a stator, thereby reducing the thickness of the stator in the axial direction. The overall thickness of the motor is reduced accordingly.

A further object of the present invention is to provide a brushless DC motor, wherein no positioning means of fixing means is required for the pole plate and the magnetic pole base. The pole plate and the magnetic pole base can be assembled together by two magnetically conductive tubes respectively formed on the pole plate and the magnetic pole base. The convenience and stability of assembly are increased.

SUMMARY OF THE INVENTION

To achieve the aforementioned objects, the present invention provides a brushless DC motor including a pole plate formed by means of punching a magnetically conductive plate, a magnetic pole base formed by means of punching another magnetically conductive plate, a coil assembly mounted on the magnetic pole base, a circuit board mounted on the magnetic pole base, and a rotor.

The pole plate includes a plurality of pole faces and a magnetically conductive tube. The pole faces of the pole plate are annularly located around the magnetically conductive tube of the pole plate. The magnetic pole base includes a plurality of pole faces and a magnetically conductive tube. The pole faces of the magnetic pole base are annularly located around the magnetically conductive tube of the magnetic pole base.

The magnetically conductive tube of the magnetic pole plate and the magnetically conductive tube of the pole base are securely mounted one around the other to form an axle tube. At least one bearing is received in the axle tube for rotatably holding the shaft of the rotor. The pole faces of the magnetic pole base and the pole faces of the pole plate are alternately disposed and located around the axle tube.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
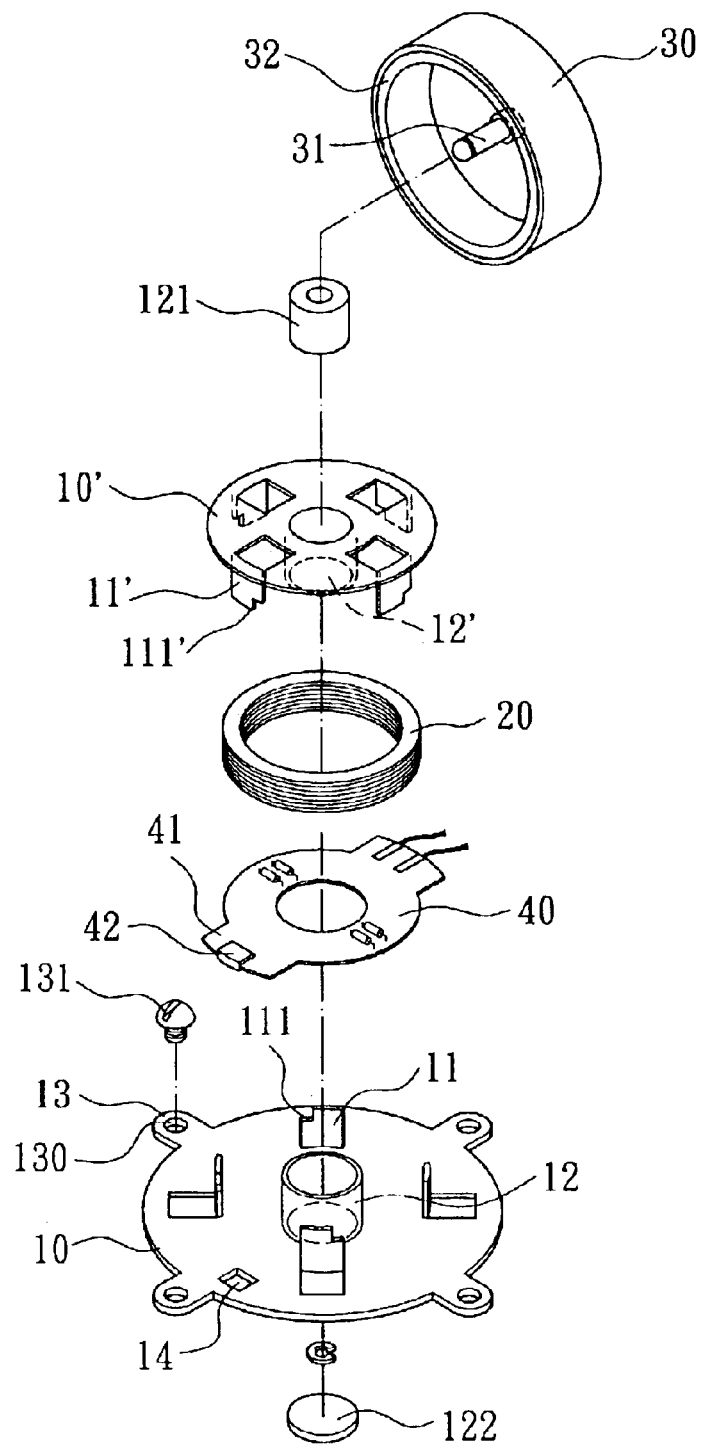
FIG. 1 is an exploded perspective view of a first embodiment of a brushless DC motor in accordance with the present invention.

Preferred embodiments of the present invention are now to be described hereinafter in detail, in which the same reference numerals are used in the preferred embodiments for the same parts as those in the prior art to avoid redundant description.

Figure 2:
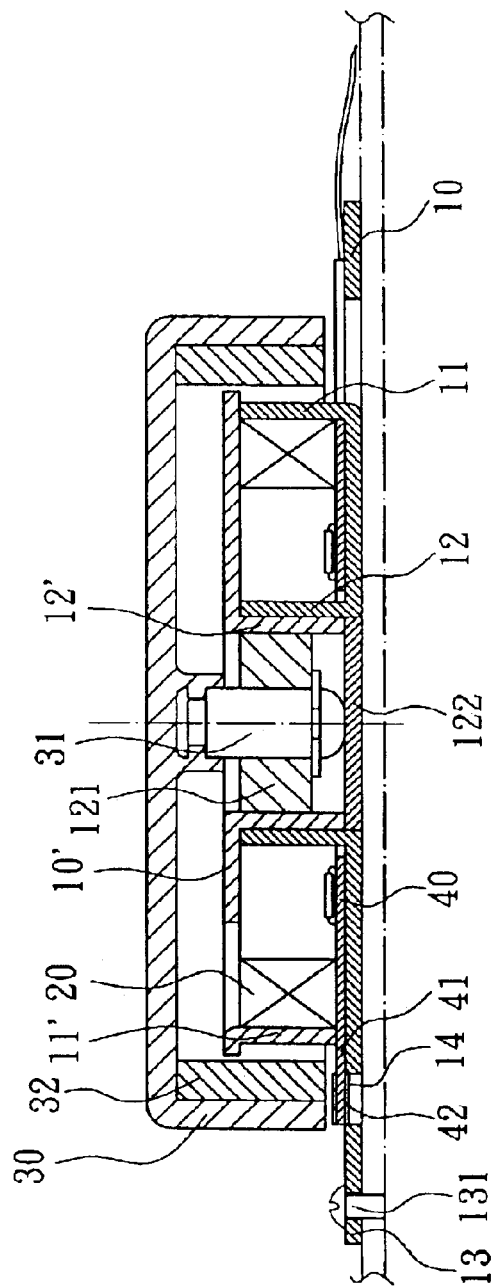
FIG. 2 is a sectional view of the brushless DC motor in FIG. 1.

Referring to FIGS. 1 and 2, a first embodiment of a brushless DC motor in accordance with the present invention comprises a magnetic pole base 10 and a pole plate 10' that are respectively preferably formed by means of punching, a single magnetically conductive plate. The magnetic pole base 10 can be used as a base for directly mounting a coil assembly 20 and a circuit board 40 of a stator, as illustrated in each FIGS. 2–8. Preferably, the magnetic pole base 10 is punched to form a plurality of pole faces 11, a magnetically conductive tube 12, a plurality of fixing portions 13, and an opening 14. The pole plate 11' is punched to form a plurality of pole faces 11' and a magnetically conductive plate 12'. Preferably, the pole faces 11 are located around the magnetically conductive tube 12 of the magnetic base 10 and spaced at intervals. Similarly, the pole faces 11' are located around the magnetically conductive tube 12' of the pole plate 10' and spaced at intervals. Further, the pole faces 11 and 11' are alternately disposed an adjacent to the coil assembly.

The magnetically conductive tube 12 is formed by means of punching a central area of the magnetic pole base 10, and the magnetically conductive tube 12' is formed by means of punching a central area of the pole plate 10', with the magnetically conductive tube 12 of the magnetic pole base 10 and the magnetically conductive tube 12' of the pole plate 10' being securely mounted one around the other, thereby securing the magnetic pole base 10 and the pole plate 10' together. Thus, the magnetically conductive tube 12 of the magnetic pole base 10 and the magnetically conductive tube 12' of the pole plate 10' together form an axle tube for receiving at least one bearing 121 (a self-lubricating bearing or ball bearing) and a support 122. The bearing 121 not only rotatably holds a shaft 31 of a rotor 30 but also increases the strength of the magnetically conductive tube 12 of the magnetic pole base 10 and the magnetically conductive tube 12' of the pole plate 10' after assembly. A distal end of the shaft 31 of the rotor 30 is supported by the support 122, best shown in FIG. 2.

In this embodiment, each fixing portion 13 is a lug projecting radially outward from a periphery of the magnetic pole base 10 and has a hole 130 through which a fastener 131 is extended, thereby fixing the magnetic pole base 10 to a casing of a heat-dissipating fan or an inner side of an electronic device such as a notebook type computer. The circuit board 40 includes an extension 41 on which a sensor 42 is mounted. The sensor 42 is located in the opening 14 and adjacent to a permanent magnet 32 on the rotor 30 to thereby detect a change in the polarity of the permanent magnet 32.

Further, a top end of each pole face 11, 11' may include a cut-out or notch 111, 111' of an appropriate shape for creating non-uniform alternating magnet fields when the power is turned on, thereby allowing easy starting of the rotor 30.

Figure 3:
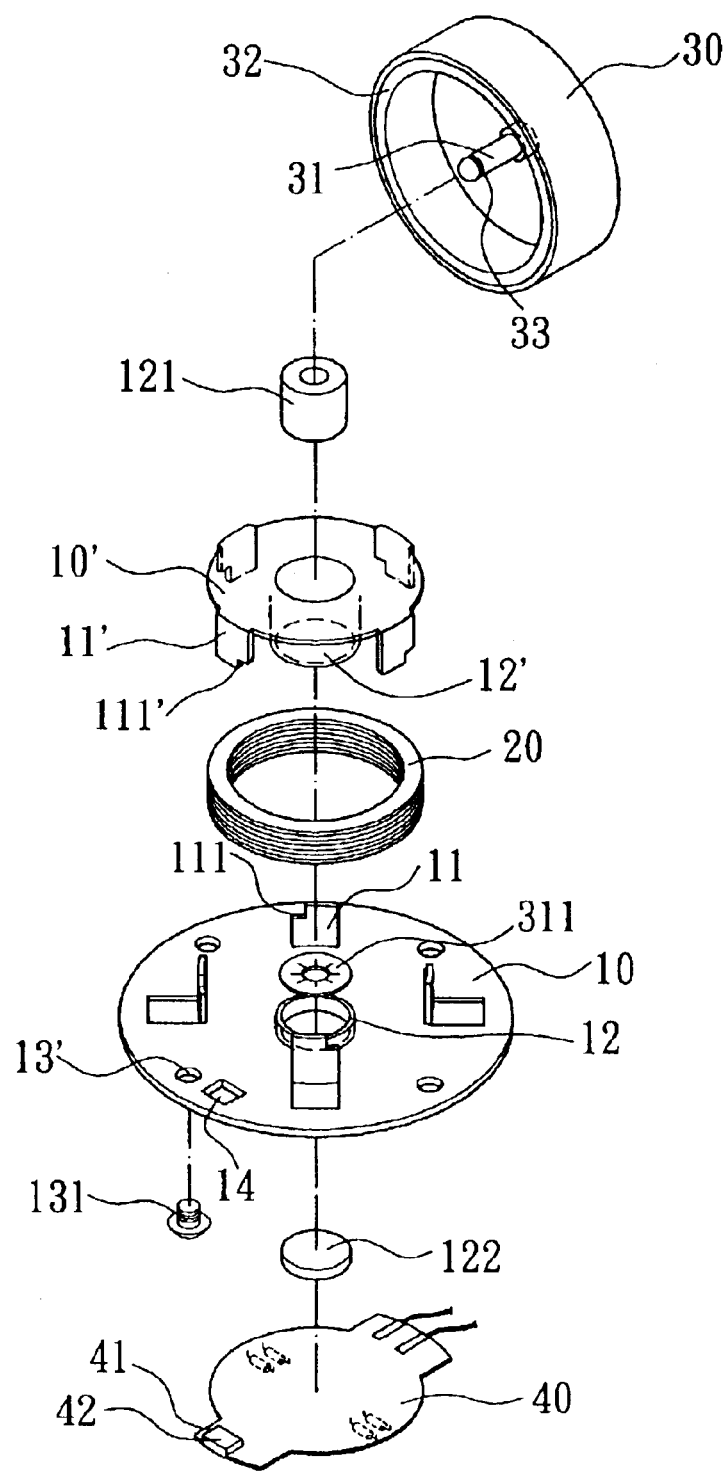
FIG. 3 is an exploded perspective view of a second embodiment of a brushless DC motor in accordance with the present invention.
Figure 4:
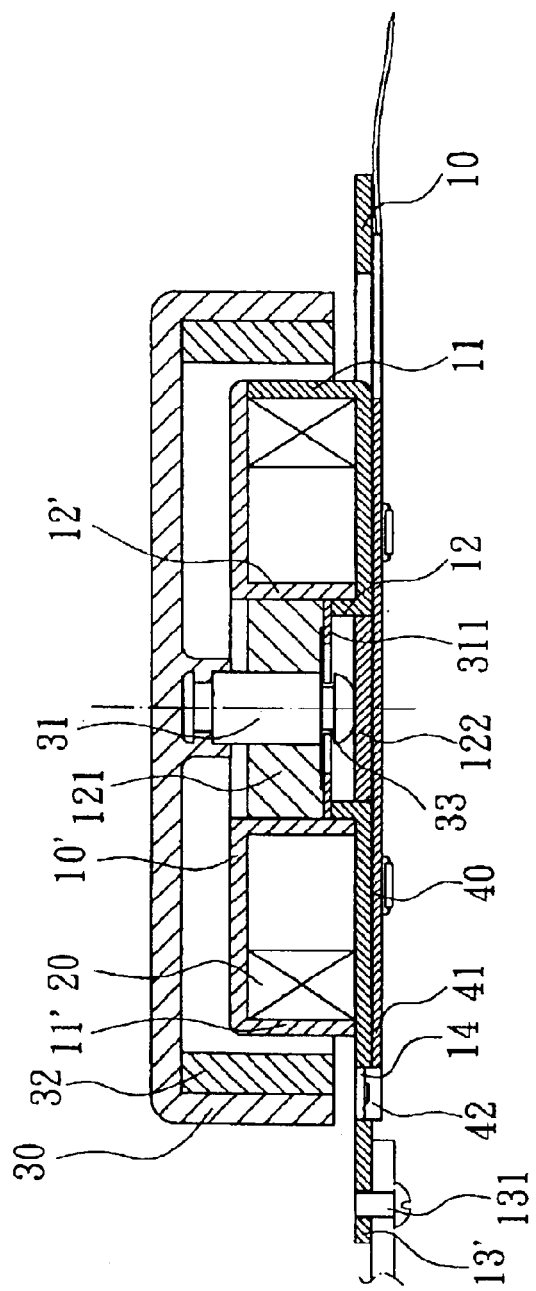
FIG. 4 is a sectional view of the brushless DC motor in FIG. 3.

FIGS. 3 and 4 illustrate a second embodiment of the brushless DC motor that is modified from the first embodiment. In this embodiment, the circuit board 40 is mounted to an underside of the magnetic pole base 10 (the base), providing a better heat-dissipating effect for the circuit board 40. No central hole is required for the circuit board 40 (c.f. FIG. 1). allowing more electronic elements to be mounted on the circuit board 40. Further, the length of the magnetically conductive tube 12 of the magnetic pole base 10 is reduced, and the magnetically conductive tube 12 of the magnetic pole base 10 is securely engaged to an inner periphery of the magnetically conductive tube 12' of the pole plate 10'. A holder ring 311 is sandwiched between an end face of the magnetically conductive tube 12 of the magnetic pole base 10 and an end face of the bearing 121. The holder ring 311 is mounted around a reduced section 33 of the distal end of the shaft 31 of the rotor 30, thereby restraining the position the distal end of the shaft 31 of the rotor 30. A support 122 is mounted in the magnetically conductive tube 12 of the magnetic pole base 10 for supporting the distal end of the shaft 31 of the rotor 30. The support 122 is engaged to the inner periphery of the magnetically conductive tube 12 of the magnetic pole base 10 for increasing the strength of the magnetically conductive tube 12 of the magnetic pole base 10 and the magnetically conductive tube 12' of the pole plate 10' after assembly. The assembling stability of the magnetically conductive tube 12 of the magnetic pole base 10 and the magnetically conductive tube 12' of the pole plate 10' is thus improved. Further, the fixing portions (now designated by 13') in this embodiment are a plurality of holes defined in the magnetic pole base 10 (the base), allowing the brushless DC motor to be mounted to an appropriate position.

Figure 5:
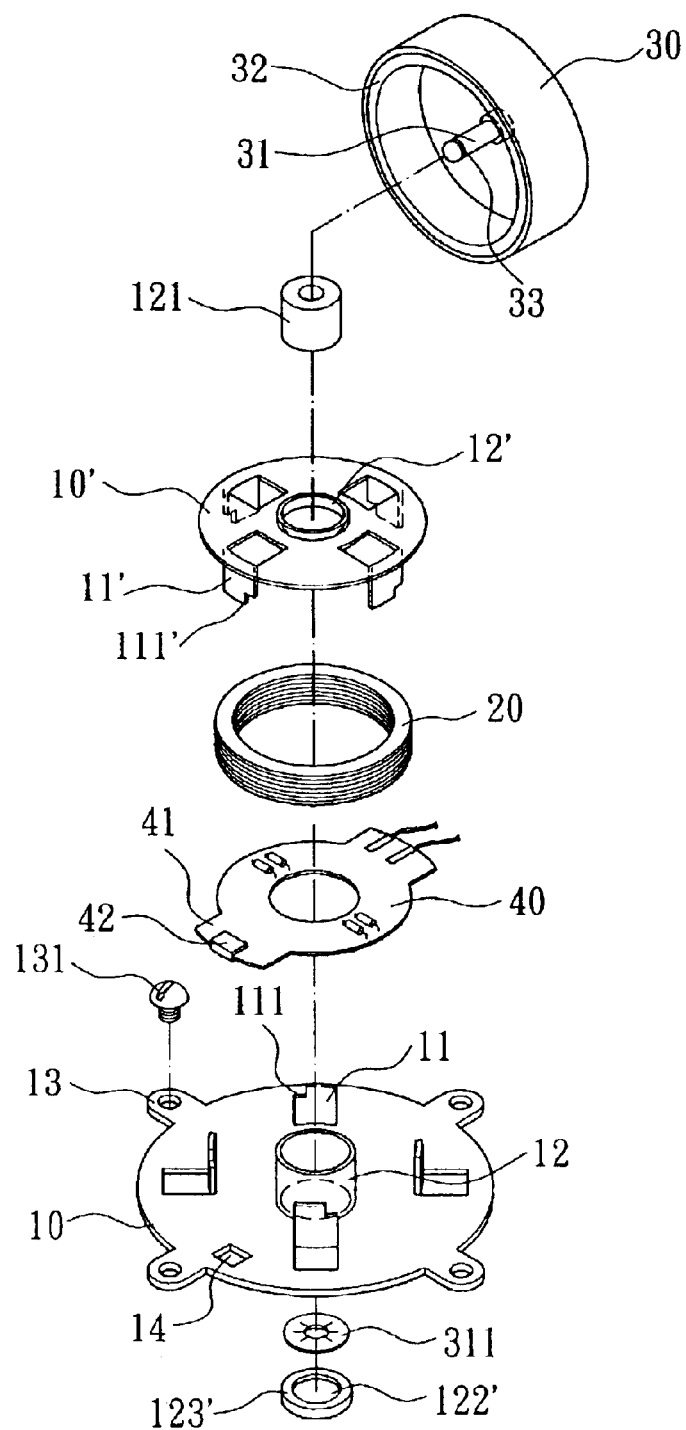
FIG. 5 is an exploded perspective view of a third embodiment of a brushless DC motor in accordance with the present invention.
Figure 6:
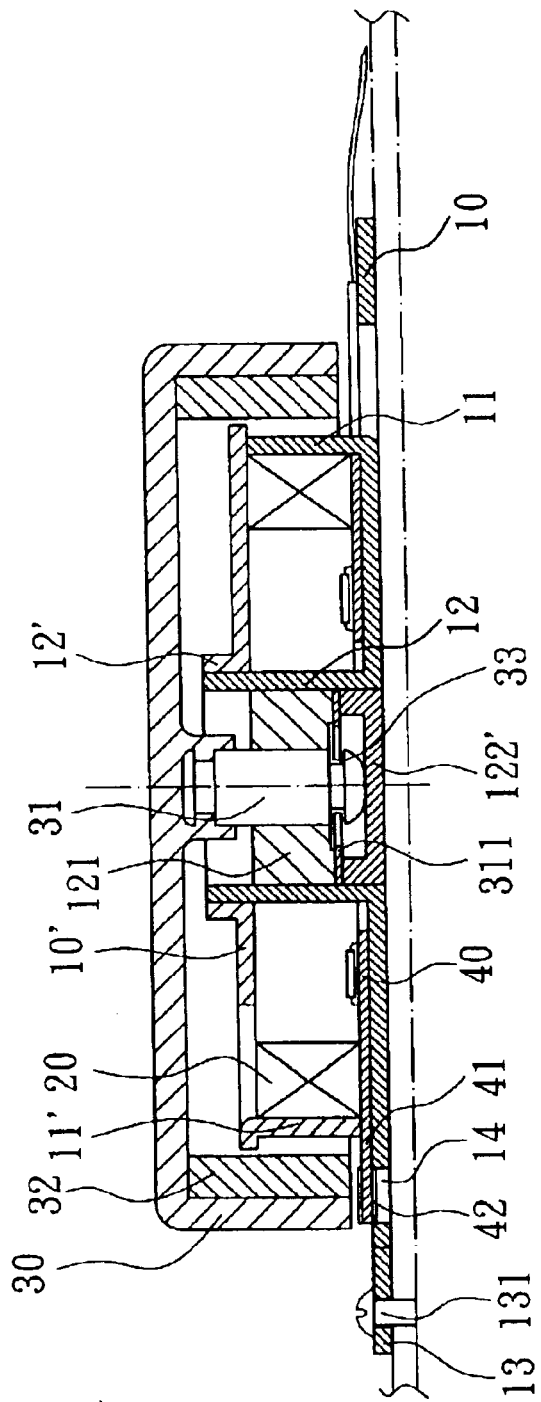
FIG. 6 is a sectional view of the brushless DC motor in FIG. 5.

FIGS. 5 and 6 illustrate a third embodiment of the brushless DC motor in accordance with the present invention. In this embodiment, the magnetically conductive tube (now designated by 12') of the pole plate 10' extends upward toward the rotor 30 and has a length smaller than that of the first embodiment and that of the second embodiment. The magnetically conductive tube 12' of the pole plate 10' is mounted to an outer periphery of the magnetically conductive tube 12 of the magnetic pole base 10, thereby reducing the gap, between an upper end of the magnetically conductive tube 12 of the magnetic pole base 10 and an inner periphery of the rotor 30 and reducing the gap between an upper end of the magnetically conductive tube 12' of the pole plate 10' and the inner periphery of the rotor 30. This prevents the shaft 31 of the rotor 30 from being stuck as a result of entrance of dust into the bearing 121. The life of the brushless DC motor is prolonged accordingly. Further, a support 122' is securely mounted to an inner periphery of the magnetically conductive tube 12. A holder ring 311 that rotatably holds a reduced section 33 of the distal end of the shaft 31 of the rotor 30 is sandwiched between an end face of the support 122' and an end face of the bearing 121, thereby restraining the position the shaft 31 of the rotor 30. Preferably, the support 122' includes an annular wall 123' for further restraining the position of the distal end of the shaft 31 of the rotor 30.

Figure 7:
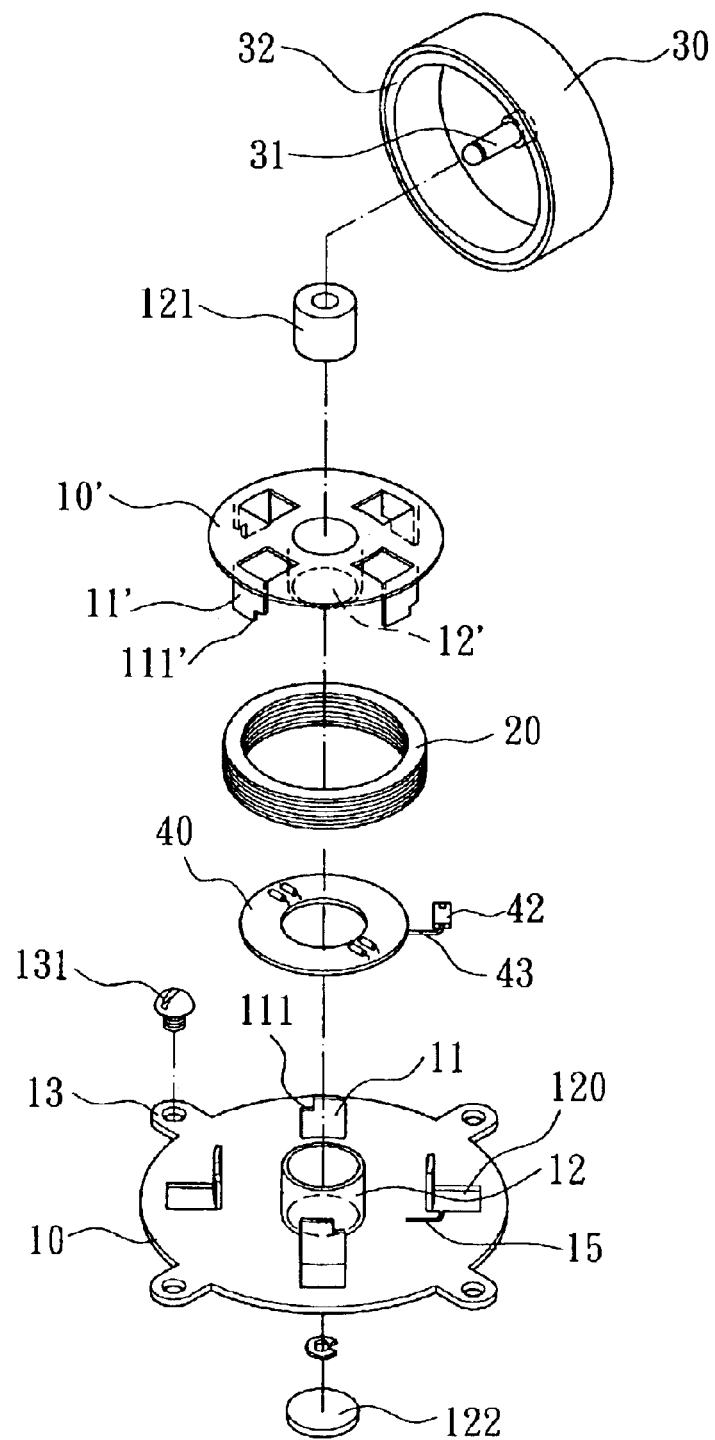
FIG. 7 is an exploded perspective view of a fourth embodiment of a brushless DC motor in accordance with the present invention.
Figure 8:
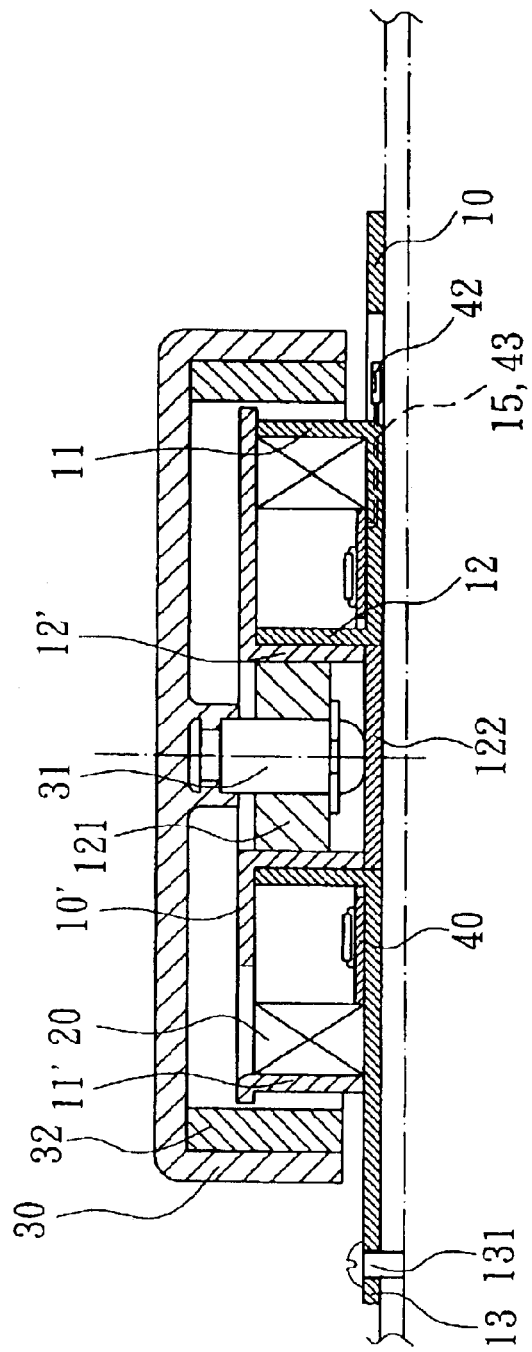
FIG. 8 is a sectional view of the brushless DC motor in FIG. 7.
Figure 9:
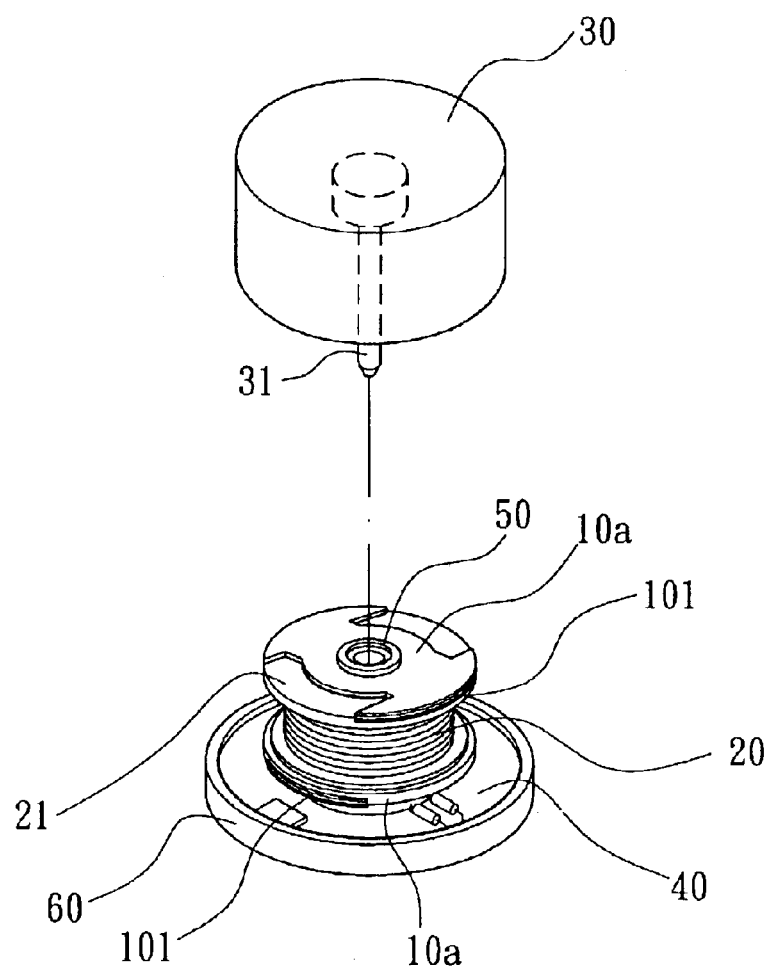
FIG. 9 is an exploded perspective view of a conventional brushless DC motor.

FIGS. 7 and 8 illustrate a fourth embodiment of the brushless DC motor in accordance with the present invention, wherein a slot 15 is formed in the magnetic pole base 10 by means of punching for receiving a wire 43 that connects a sensor 42 to the circuit board 40. The sensor 42 is directly mounted in one of a plurality of openings 120 that are formed as a result of punching the magnetic pole base 10 for forming the pole faces 11. The circuit board 40 of this embodiment has no extension (c.f. FIGS. 1, 3, and 5) and thus has a relatively smaller area. This also reduces the risk of increasing the overall thickness of the brushless DC motor as a result of stacking the circuit board 40 and the coil assembly 20 in the axial direction. Further, the turns of the coil assembly 20 can be increased to thereby increase the intensity of the alternating energizing of the stator.

In conclusion, the present invention provides a brushless DC motor including a magnetic pole base 10 and a pole plate 10' that are respectively formed by means of punching a magnetically conductive plate. Each of the magnetic pole base 10 and the pole plate 10' includes a plurality of pole faces 11, 11' and a magnetically conductive tube 12, 12'. The magnetic pole base 10 can be used as a base on which the parts of the stator are mounted, thereby reducing the number of parts of the brushless DC motor, simplifying the structure of the brushless DC motor, and reducing the manufacture cost of the brushless DC motor.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A brushless DC motor comprising:

a pole plate formed by means of punching a magnetically conductive plate made of a single metal sheet, the pole plate including a plurality of pole faces and a magnetically conductive tube, the pole faces of the pole plate being annularly located around the magnetically conductive tube of the pole plate;

a magnetic pole base formed by means of punching another magnetically conductive plate made of a single metal sheet, the magnetic pole base including a plurality of pole faces and a magnetically conductive tube, the pole faces of the magnetic pole base being annularly located around the magnetically conductive tube of the magnetic pole base;

a coil assembly directly mounted on the magnetic pole base and situated in a space between the pole plate and the magnetic pole base;

a circuit board also mounted on the magnetic pole base; and a rotor including a shaft and a permanent magnet; and a holder ring mounted around the shaft of the rotor;

the magnetically conductive tube of the magnetic pole plate being received in the magnetically conductive tube of the pole base to form an axle tube, at least one bearing being received in the axle tube for rotatably holding the shaft of the rotor such that said holder ring is sandwiched between an end face of the magnetically conductive tube of the magnetic pole base and an end face of the bearing; and the pole faces of the magnetic pole base and the pole faces of the pole plate being alternately disposed and located around the axle tube.

2. The brushless DC motor as claimed in claim 1, wherein the pole faces of the magnetic pole base are located around the magnetically conductive tube of the magnetic pole base and spaced at intervals, and wherein the pole faces of the pole plate are located around the magnetically conductive tube of the pole plate and spaced at intervals.

3. The brushless DC motor as claimed in claim 1, wherein each said pole face has a cut-out on a top end thereof.

4. The brushless DC motor as claimed in claim 1, further including a support mounted to an inner periphery of the magnetically conductive tube of the magnetic pole base for rotatably supporting a distal end of the shaft of the motor.

5. The brushless DC motor as claimed in claim 4, wherein the support includes an annular wall for restraining a position of the distal end of the shaft the rotor.

6. The brushless DC motor as claimed in claim 1, wherein the magnetically conductive tube of the pole plate extends toward the rotor, the magnetically conductive tube of the pole plate being mounted around the magnetically conductive tube of the magnetic pole base, thereby reducing a gap between an upper end of the axle tube and an inner periphery of the rotor.

7. The brushless DC motor as claimed in claim 1, wherein the circuit board further includes an extension on which a sensor is mounted, the sensor being located below the permanent magnet of the rotor.

8. The brushless DC motor as claimed in claim 7, wherein the magnetic pole base includes an opening for receiving the sensor.

9. The brushless DC motor as claimed in claim 1, wherein the magnetic pole base includes a slot, the circuit board including a wire and a sensor attached to the wire, the wire extending along the slot, the sensor being located below the permanent magnet of the rotor.

10. The brushless DC motor as claimed in claim 9, wherein the magnetic pole base includes a plurality of openings that are formed as a result of punching the magnetic pole base for forming the pole faces of the magnetic pole base, and wherein the sensor is located in one of the openings.

11. The brushless DC motor as claimed in claim 1, wherein the circuit board is mounted to an underside of the magnetic pole base.

12. The brushless DC motor as claimed in claim 1, wherein the magnetic pole base includes a plurality of fixing portions for mounting the magnetic pole base.

13. The brushless DC motor as claimed in claim 12, wherein each of the fixing portions is a lug projecting radially outward from a periphery of the magnetic pole base and a hole in the lug.

14. The brushless DC motor as claimed in claim 12, wherein each of the fixing portions is a hole defined in the magnetic pole base.

15. The brushless DC motor as claimed in claim 1, wherein the magnetically conductive tube of the pole plate is located in a center of the pole plate.

16. The brushless DC motor as claimed in claim 1, wherein the magnetically conductive tube of the magnetic pole base is located in a center of the magnetic pole base.

17. The brushless DC motor as claimed in claim 1, wherein said circuit board is situated in the space between the magnetic pole base and the pole plate.

* * * * *